US008073928B2

(12) United States Patent
Dolin et al.

(10) Patent No.: US 8,073,928 B2
(45) Date of Patent: *Dec. 6, 2011

(54) AGGREGATING AND SEARCHING PROFILE DATA FROM MULTIPLE SERVICES

(75) Inventors: Rob Dolin, Seattle, WA (US); Oludare Obasanjo, Seattle, WA (US); Michael I. Torres, Seattle, WA (US); Jason C. Fluegel, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/904,989

(22) Filed: Oct. 14, 2010

(65) Prior Publication Data

US 2011/0035464 A1 Feb. 10, 2011

Related U.S. Application Data

(63) Continuation of application No. 11/766,363, filed on Jun. 21, 2007, now Pat. No. 7,818,396.

(51) Int. Cl.
*G06F 15/16* (2006.01)
*G06F 15/167* (2006.01)
*G06F 17/30* (2006.01)
(52) U.S. Cl. ......... 709/217; 709/214; 707/709; 707/784
(58) Field of Classification Search ................... 709/217; 707/709, 784
See application file for complete search history.

(56) References Cited

U.S. PATENT DOCUMENTS

| | | | |
|---|---|---|---|
| 6,839,680 B1 | 1/2005 | Liu et al. | |
| 6,976,066 B1 | 12/2005 | Mouhanna et al. | |
| 7,117,254 B2 | 10/2006 | Lunt et al. | |
| 7,155,508 B2 | 12/2006 | Sankuratripati et al. | |
| 7,797,318 B2 | 9/2010 | Torres et al. | |
| 2002/0029254 A1 | 3/2002 | Davis et al. | |
| 2002/0029267 A1 | 3/2002 | Sankuratripati et al. | |
| 2002/0049770 A1 | 4/2002 | Mayadas | |
| 2002/0073088 A1 | 6/2002 | Beckmann et al. | |
| 2002/0129145 A1 | 9/2002 | Chow | |
| 2003/0220977 A1 | 11/2003 | Malik | |
| 2004/0119760 A1 | 6/2004 | Grossman et al. | |
| 2005/0164704 A1 | 7/2005 | Winsor | |
| 2005/0209999 A1 | 9/2005 | Jou | |
| 2005/0216550 A1 | 9/2005 | Paseman et al. | |

(Continued)

FOREIGN PATENT DOCUMENTS

JP 2006309660 A 11/2006

(Continued)

OTHER PUBLICATIONS

U.S. Appl. No. 11/766,363, filed Jun. 21, 2007.

(Continued)

*Primary Examiner* — Joseph E Avellino
*Assistant Examiner* — Aftab Nasir Khan
(74) *Attorney, Agent, or Firm* — Vierra Magen Marcus & DeNiro LLP

(57) ABSTRACT

Profile data from multiple networking services can be combined and queried from one networking service. A primary networking service may store user profile data for one or more secondary networking services and the primary networking service. When stored, the data from the multiple networks may be aggregated or merged. The stored data may include user profile data and relationship data for each networking service that a primary networking service has a profile account with. A graph of user-contact relationships existing over the primary networking service and one or more secondary networking services may be constructed and queried against.

16 Claims, 11 Drawing Sheets

U.S. PATENT DOCUMENTS

| | | | |
|---|---|---|---|
| 2006/0184578 | A1 | 8/2006 | La Rotonda et al. |
| 2006/0195474 | A1 | 8/2006 | Cadiz et al. |
| 2006/0251239 | A1 | 11/2006 | Taylor et al. |
| 2007/0002057 | A1 | 1/2007 | Danzig et al. |
| 2008/0091834 | A1 | 4/2008 | Norton |
| 2008/0172464 | A1 | 7/2008 | Thattai et al. |
| 2008/0183814 | A1 | 7/2008 | Sanghavi |
| 2008/0189366 | A1 | 8/2008 | Cox et al. |
| 2008/0209343 | A1 | 8/2008 | Macadaan et al. |
| 2008/0222199 | A1 | 9/2008 | Tiu et al. |
| 2008/0250332 | A1 | 10/2008 | Farrell et al. |
| 2008/0316925 | A1 | 12/2008 | Dolin et al. |
| 2009/0024452 | A1 | 1/2009 | Martinez et al. |
| 2009/0031301 | A1 | 1/2009 | D'Angelo et al. |
| 2009/0070412 | A1 | 3/2009 | D'Angelo et al. |
| 2009/0150222 | A1 | 6/2009 | Polonsky |
| 2009/0265432 | A1 | 10/2009 | Suehiro |

FOREIGN PATENT DOCUMENTS

| | | | |
|---|---|---|---|
| JP | 2006318226 | A | 11/2006 |
| JP | 2007052557 | A | 3/2007 |
| JP | 2008543132 | A | 11/2008 |
| JP | 2009506427 | A | 2/2009 |
| WO | 2006121863 | A2 | 11/2006 |
| WO | 2007026810 | A1 | 3/2007 |

OTHER PUBLICATIONS

SPOEKO Inc., "Hundreds of Friends, Hundreds of Networks, One Destination", http://www.spokeo.com/public/home?intro=1.
Michael Arrington, "ProfileLinker Takes Meebo Approach to Social Networking", Dec. 28, 2006, http://www.techcrunch.com/2006/12/28/profilelinker-takes-meebo-approach-to-social-networking/.
Frank Gruber, Feb. 1, 2007, "The Web Profile Aggregators", http://www.somewhatfrank.com/2007/02/the_web_profile.html.
Broadband Mechanics, Inc., "People Aggregator", 2006, http://www.broadbandmechanics.com/.
International Search Report & The Written Opinion of the International Searching Authority mailed Nov. 25, 2008, Patent Cooperation Treaty, Application No. PCT/US2008/065475 filed Jun. 2, 2008.
Office Action dated Jul. 31, 2009, United States Patent & Trademark Office, U.S. Appl. No. 11/766,363, filed Jun. 21, 2007.
Response to Office Action filed Oct. 15, 2009, United States Patent & Trademark Office, U.S. Appl. No. 11/766,363, filed Jun. 21, 2007.
Final Office Action dated Jan. 4, 2010, United States Patent & Trademark Office, U.S. Appl. No. 11/766,363, filed Jun. 21, 2007.
Response to Final Office Action filed Apr. 1, 2010, United States Patent & Trademark Office, U.S. Appl. No. 11/766,363, filed Jun. 21, 2007.
Notice of Allowance and Fee(s) Due dated Aug. 4, 2010, United States Patent & Trademark Office, U.S. Appl. No. 11/766,363, filed Jun. 21, 2007.
Response to Office Action filed Oct. 12, 2010 in South African Patent Application No. 2009/07175.
Chinese Voluntary Amendments dated Jul. 8, 2010, Chinese Patent Application No. 200880020079.7 filed Jun. 2, 2008, 8 pages.
Partial English Translation of the Chinese Voluntary Amendments dated Jul. 8, 2010, Chinese Patent Application No. 200880020079.7 filed Jun. 2, 2008 showing Claims 11-17 which were the claims amended in the Voluntary Amendments, 2 pages.
Chinese Office Action dated Apr. 20, 2011, Chinese Patent Application No. 200880020079.7 filed Jun. 2, 2008, 7 pages.
Partial English Translation of Chinese Office Action dated Apr. 20, 2011, Chinese Patent Application No. 200880020079.7 filed Jun. 2, 2008, 17 pages.
English Translation of Pending Claims as of Jun. 13, 2011, Chinese Patent Application No. 200880020079.7 filed Jun. 2, 2008, 3 pages.
Extended European Search Report dated Aug. 2, 2011, European Application No. 08769953.4, filed Jun. 2, 2008, 6 pages.
Response to Chinese Office Action dated Aug. 11, 2011, Chinese Patent Application No. 200880020079.7, filed Jun. 2, 2008, 24 pages.
Japanese Office Action dated Aug. 24, 2011, Japanese Patent Application No. 2010-513311 filed Jun. 2, 2008, 9 pages.
English Abstract of Foreign Patent Document WO2007026810, published Mar. 8, 2007, applicant Access Co Ltd, 1 page.
English Abstracts of Foreign Patent Document JP2006318226, published Nov. 24, 2006, applicant Fujitsu Ltd, 2 pages.
English Machine Translation of Foreign Patent Document JP2006318226, published Nov. 24, 2006, applicant Fujitsu Ltd, 22 pages.
English Abstracts of Foreign Patent Document JP2006309660, published Nov. 9, 2006, applicant Japan Broadcasting Corp, 2 pages.
English Machine Translation of Foreign Patent Document JP2006309660, published Nov. 9, 2006, applicant Japan Broadcasting Corp, 24 pages.
English Abstracts of Foreign Patent Document JP2007052557, published Mar. 1, 2007, applicant Mori Junichiro et al., 2 pages.
English Abstract of Foreign Patent Document JP2008543132, published Nov. 27, 2008, applicant Qual-Comm Incorporated, 1 page.
English Abstract of Foreign Patent Document JP2009506427, published Feb. 12, 2009, applicant Microsoft Corporation, 1 page.
"Mixi Graph Displays Correlation Diagrams," DOS/V magazine, May 1, 2005, vol. 14, No. 5, p. 199, 1 page.
"Report on Actual Condition Survey on Usage of Electronic Information Services for Companies," Mar. 2007, at least pp. 18-19 and p. 13 of annex, 6 pages.

AGGREGATING AND SEARCHING PROFILE DATA FROM MULTIPLE SERVICES

CLAIM OF PRIORITY TO PRIOR APPLICATIONS

This is a continuation application of U.S. patent application Ser. No. 11/766,363, filed Jun. 21, 2007, titled "Aggregating and Searching Profile Data From Multiple Services", now U.S. Patent No. 7,818,396, and incorporated herein by reference.

BACKGROUND

The growing presence of the Internet as well as other computer networks such as intranets and extranets has brought many new network services, including personal and professional networking services. Many people have one or more accounts over networking services that allow users to maintain a profile. The profiles may include social and professional networking relationships, contact information, blogs, photo sharing, video, classified ads and other content.

Though several networking services are available, they typically contain separate data and are operated independently of each other. To experience and view user profiles over different networks, a viewing user must access each service that a second user has subscribed to. Traversing to separate networking services to view and search separate profiles can be burdensome, even if the viewing user knows the location of each user profile to be viewed (which may not be the case).

SUMMARY

The present technology, roughly described, enables profile data from multiple networking services to be aggregated and accessed by a user of one primary networking service. User profile data for one or more secondary networking services and a primary networking service is aggregated within the primary networking service. The combined secondary networking service data and primary networking service data may include user profile data and relationship data for users having an account with the primary networking service. Profile data may be shown for multiple networking services simultaneously as an aggregated or merged profile.

A graph of user-contact relationships existing in the primary networking service and one or more secondary networking services may be built, traversed and searched based on relationship data for each service which is stored within the primary networking service. When constructed, the graph may be used to traverse indirect connections between users which do not have any direct connection in any one networking service.

In some embodiments, profile data from one or more secondary networking services is retrieved. The data may be retrieved by a crawling mechanism, through an application program interface, an RSS feed or using some other mechanism. The retrieved profile data is stored and optionally processed. The stored data includes user profile data as well as user relationship data for each of the secondary networking service profiles accessed. In some embodiments, the stored relationship data associated with each contact profile may be removed in order to prevent duplicate connection data. Multiple network profile data can then be queried and provided based on stored profile content and relationship data.

In an embodiment, a first primary networking service user is identified as a user who has profile data maintained by a primary networking service. A second set of profile data associated with the first user is retrieved from a secondary networking service. The primary networking service and secondary networking service store their respective user profile data separately from each other. The retrieved second set of profile data is stored in one or more data stores associated with the first primary networking service. Storing the data may include aggregating the primary networking service profile data with secondary networking service profile data within the one or more data stores.

In an embodiment, aggregated data from multiple networks may be provided in response to a request. A request for one or more user profiles of a primary networking service may be received. A data store may then be queried for the requested one or more profiles. The data store may contain aggregated profile data constructed from primary networking service profile data (first sets of profile data) and secondary networking service profile data (second sets of profile data), wherein the primary networking service and secondary networking service are separate services provided over a network. A subset of the aggregated profile data is accessed based on relationship data included in the one or more first sets of profile data and the one or more second sets of profile data. The relationship data in the one or more second sets of profile data includes a trusted relationship between two users of the primary networking service. The trusted relationship is not specified in the relationship data of the one or more first sets of profile data of the primary networking service. The subset of the aggregated profile data is then provided to the client.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Profile data from multiple networking services can be combined and queried from one networking service. A primary networking service may store user profile data for one or more secondary networking services and the primary networking service. When stored, the data from the multiple networks may be aggregated or merged. The stored secondary networking service data and primary networking service data may include user profile data and relationship data for each networking service that a primary networking service has a profile account with. When requested, profile data may be shown for multiple networking services simultaneously as an aggregated or merged profile. For example, a primary networking service of "Windows Live Spaces," provided by Microsoft Corporation of Redmond, Wash., may retrieve and store data from secondary networking service. "Windows Live Spaces" may then display profiles for its own users which also include any corresponding "LinkedIn" profile data for those users.

A graph of user-contact relationships existing in the primary networking service and one or more secondary networking services may be built, traversed and searched. Searching and querying of the data may be performed based on relationship data for each service (which is stored within the primary networking service). When constructed, the graph may be used to traverse transitive connections between users which do not have any direct connection in any one networking service.

Profile data from one or more secondary networking services is retrieved by a mechanism of the primary networking service. The data may be retrieved by a crawling mechanism, through an application program interface, an RSS feed or some other mechanism. The retrieved profile data may include user profile data and user relationship data for each of the secondary networking service profiles accessed. The retrieved data is stored and can be queried based on stored profile content and relationship data.

Figure 1:
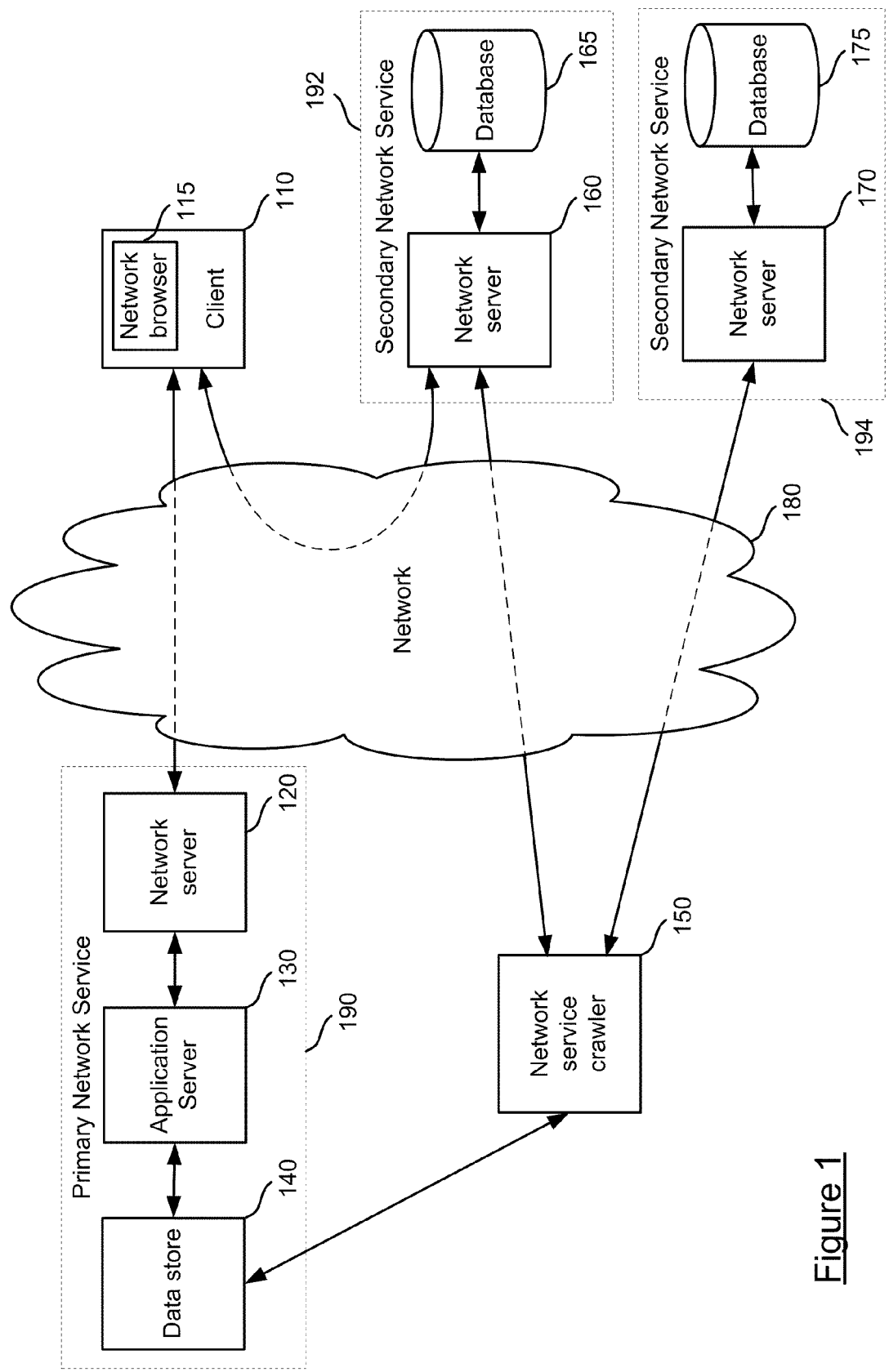
FIG. 1 is a block diagram of an embodiment of a system for aggregating and querying user profiles from multiple networking services.

FIG. 1 is a block diagram of an embodiment of a system for aggregating and querying user profiles for multiple networking services. The system of FIG. 1 includes client 110, primary networking service 190, networking service crawler 150, secondary networking service 192, secondary networking service 194 and network 180.

Client 110 may communicate with primary networking service 190 and secondary network service 192 over network 180. Client 110 may be implemented as a mobile device, a desktop computer, a workstation or some other machine. Client 110 includes a network browser 115 or a browser client for accessing content from network servers 120 and 160 over network 180. In some embodiments, a user at client 110 may access a user account for primary networking service 190 as provided by servers 120-130 and data store 140.

Network 180 may be implemented as the Internet or other WAN, a LAN, intranet, extranet, private network or other network or networks.

Primary networking service 190 communicates with client 110 over network 180 and includes network server 120, application server 130 and data store 140. Network server 120 may be implemented as one or more servers and receive and process requests from client 110. When server 180 is the Internet, network server 120 may be implemented as a web server that provides content pages or other content, including html content, in response to a request network browser 115. In processing these requests, network server 120 may invoke one or more applications on application server 130.

Application server 130 may be implemented as one or more servers that process requests from network server 120, generate request responses, and optionally cache data from data store 140. When invoked, an application on application server 130 may access data store 140 to retrieve data or other content required to construct a response to a network server request.

Data store 140 may be implemented as one or more databases, SQL servers or some other type of storage device. In some embodiments, data store 140 contains user data for profiles, email, instant messaging and other communication services provided by one or more publishers of primary networking service. In some embodiments, profiles stored in data store 140 and provided by primary networking service 190 are part of a networking service called "Windows Live Spaces," by Microsoft Corporation, of Redmond, Wash.

Network service crawler 150 may be used to access data from secondary networking services 192 and 194 and provide data retrieved from these services to data store 140. For example, networking service crawler 150 may access a profile located at a particular URL provided by networking service 192 or 194, retrieve the profile data and store the retrieved data locally to data store 140. In some embodiments, the crawler 150 may be implemented as a mechanism that receives an RSS feed, accesses an application program interface, or accesses profile data of a secondary networking service in some other manner. Operation of networking service crawler 150 is discussed in more detail below.

Secondary networking service 192 includes network server 160 and database 165. Networking service 192 may also include one or more application servers (not illustrated in FIG. 1). The networking service provided by network server 160 and database 165 may allow one or more users to network with other users having an account with secondary networking service 192. Similarly, secondary networking service 194 includes network server 170 and database 175 and provides a networking service for one or more users having an account with that networking service. As with service 192, networking service 194 may also contain one or more application servers (not illustrated)

A secondary networking service may be a syndicated, pre-defined, or undefined networking service. A syndicated networking service may be related to primary networking service 190. For example, a syndicated networking service may be provided by the same publisher or company, such as Microsoft Corporation, as that which provides primary networking service 190. The syndicated networking service may contain different profiles than that of primary networking service 190, but the data may be associated with the same user identifier and accessed without requiring construction of a profile location such as a URL. For example, a syndicated networking service may be powered by the same publisher of die primary networking service and be co-branded with information identifying the publisher of the primary service (for example, "Helicopter Pilots R Us Spaces with Windows Live").

A predefined networking service is not provided by the same publisher as a primary networking service, but is recognized by primary networking service 190. Primary networking service 190 may construct location information (such as a URL) of a user profile for a pre-defined networking service from stored URL information of the service and user identifier information for the profile to be received. An undefined networking service is one that is not defined by primary networking service 190. Primary networking service 190 may construct profile location information (such as a URL) for an undefined networking service from profile URL information and user profile identifier information provided by a user of a primary networking service. Each type of secondary networking service is defined in more detail below.

Figure 2:
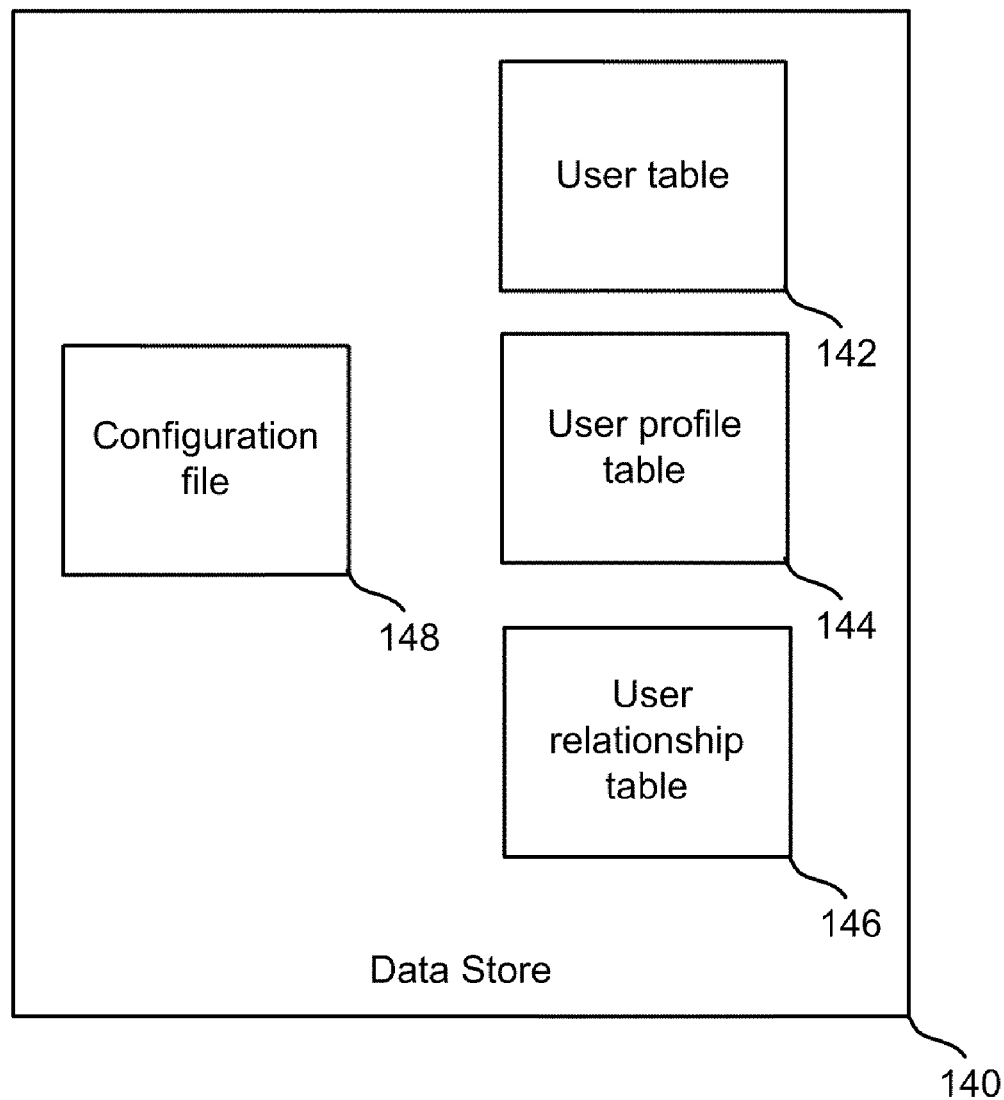
FIG. 2 is a block diagram of user profile data within a data store.

FIG. 2 is a block diagram of data store 140. Data store 140 includes user table 142, user profile table 144, user relationship table 146 and configuration file 148.

User table 142 stores user profile data for primary networking service 190. The user profile data stored in user table 142 may include user name, address, gender, occupation, email, favorites, and other user data. User profile table 144 may include a list of one or more profiles provided by one or more secondary networking services for a user having an account with primary networking service 190. Thus, for users having an account with primary networking service 190, data for their profiles in secondary networking services 192 and 194 are stored in user profile table 144. Data contained in user profile table 144 may include a user identifier provided for the primary networking service, identification of the secondary networking service associated with the user's profile in that service, and data contained in user's profile in the secondary networking service, such as a user identifier for the service, user name, address, gender, occupation, and so forth, as provided in the user profile of the secondary networking service.

User relationship table 146 may contain relationship data between two users for a secondary networking service. The data contained in user relationship table 146 includes a user identifier of a first user and a second user of primary networking service 190 and identification of the secondary networking service in which the relationship exists. User relationship table 146 may store data as an array, integer, or some other value. Configuration file 148 may store URL and other data for predefined networks and syndicated networks. This data is used to generate access information such as the URL of a profile in a secondary networking service. Utilization of configuration file 148 data is discussed in more detail below.

Figure 3:
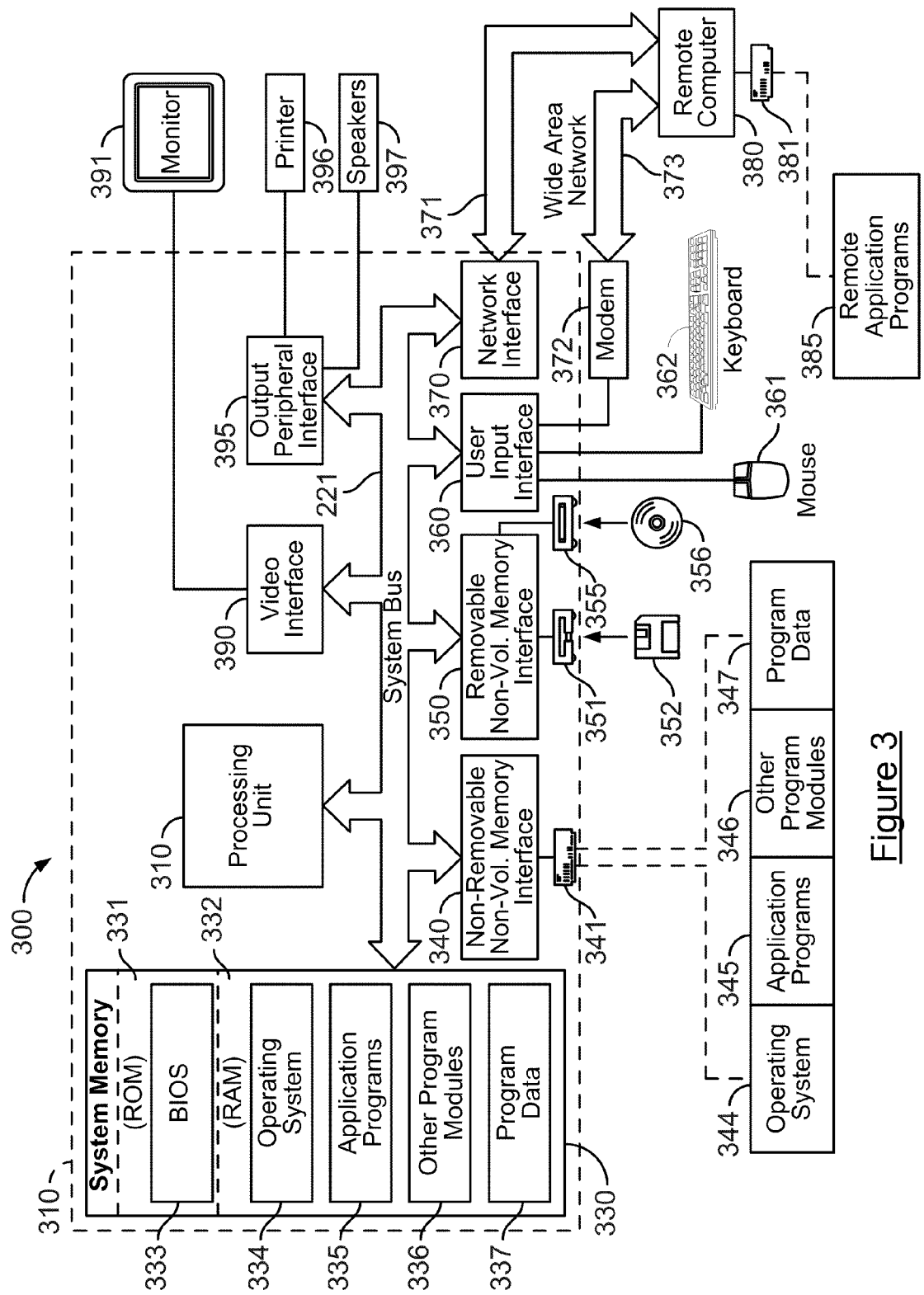
FIG. 3 is an embodiment of a computing environment for implementing the present technology.

FIG. 3 is an embodiment of a computing environment for implementing the present technology. The computing environment of FIG. 3 may be used to implement client 110, network server 120, application server 130, data store 140, networking service crawler 150, network servers 160 and 170 and databases 165 and 175.

Computing environment 300 of FIG. 3 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the technology herein includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Figure 4A:
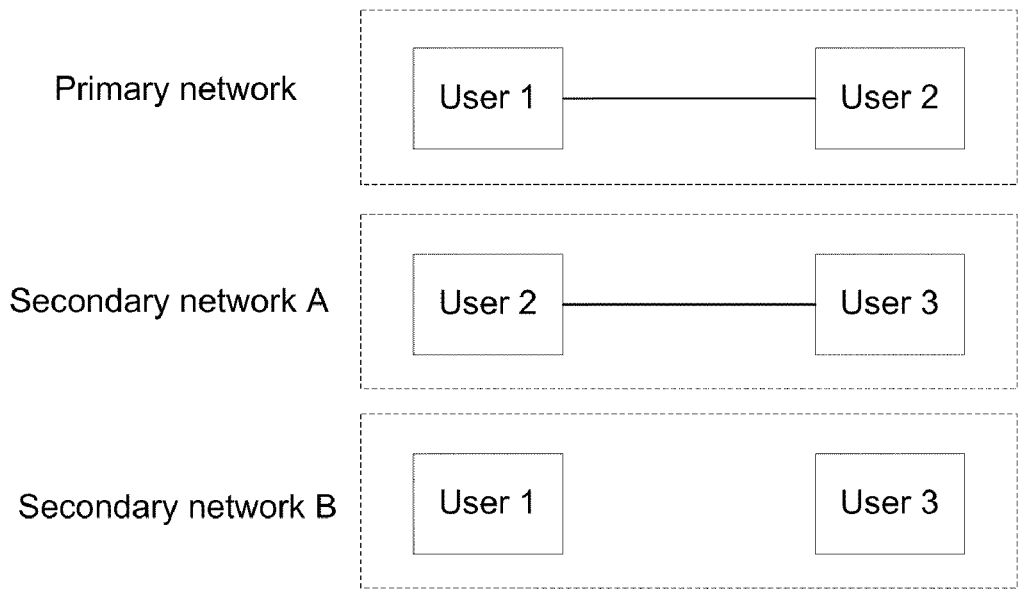
FIG. 4A is an example of user relationships within different networking services.

FIG. 4A is an example of user relationships in different networking services. FIG. 4A illustrates three network relationships. The first relationship within a primary networking service is between a first user and a second user. The line between the first user and second user indicates that the first user may have the second user listed as a "friend," thereby having a trust relationship with the second user, within the first user's account with primary networking service 190. The second relationship is for secondary networking service A, wherein the second user has a trust relationship with a third user. In the third networking service, secondary networking service B, the first user and the third user both have profiles in the service, but do not have a trust relationship with each other in the service as represented by no line connecting the users in FIG. 4A.

Figure 4B:
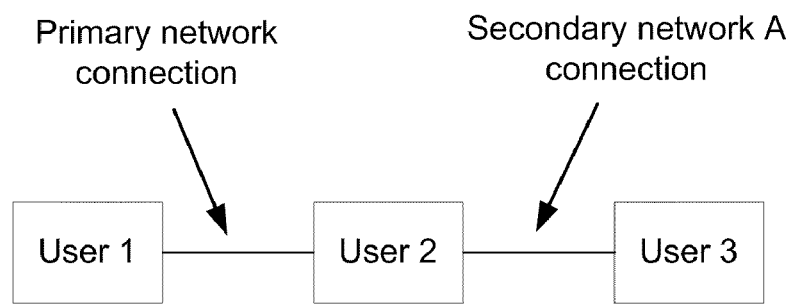
FIG. 4B is an example of inter user relationships over multiple networks.

FIG. 4B is an example of an inter-user relationship over multiple networks. In particular, it is shown that the first user and second user have a trust relationship over a primary network service and the second user and third user have a trust relationship through the secondary networking service A. Thus, it can be seen that the first user and the third user have an indirect relationship with two degrees of separation through the second user. The first user and the third user are not directly connected through any networking service but that a connection between the two may be seen as a second degree relationship over two different networking services. The present technology may recognize the second degree relationship and allow a user to traverse and query against the second degree relationship. This is discussed in more detail below.

Figure 5:
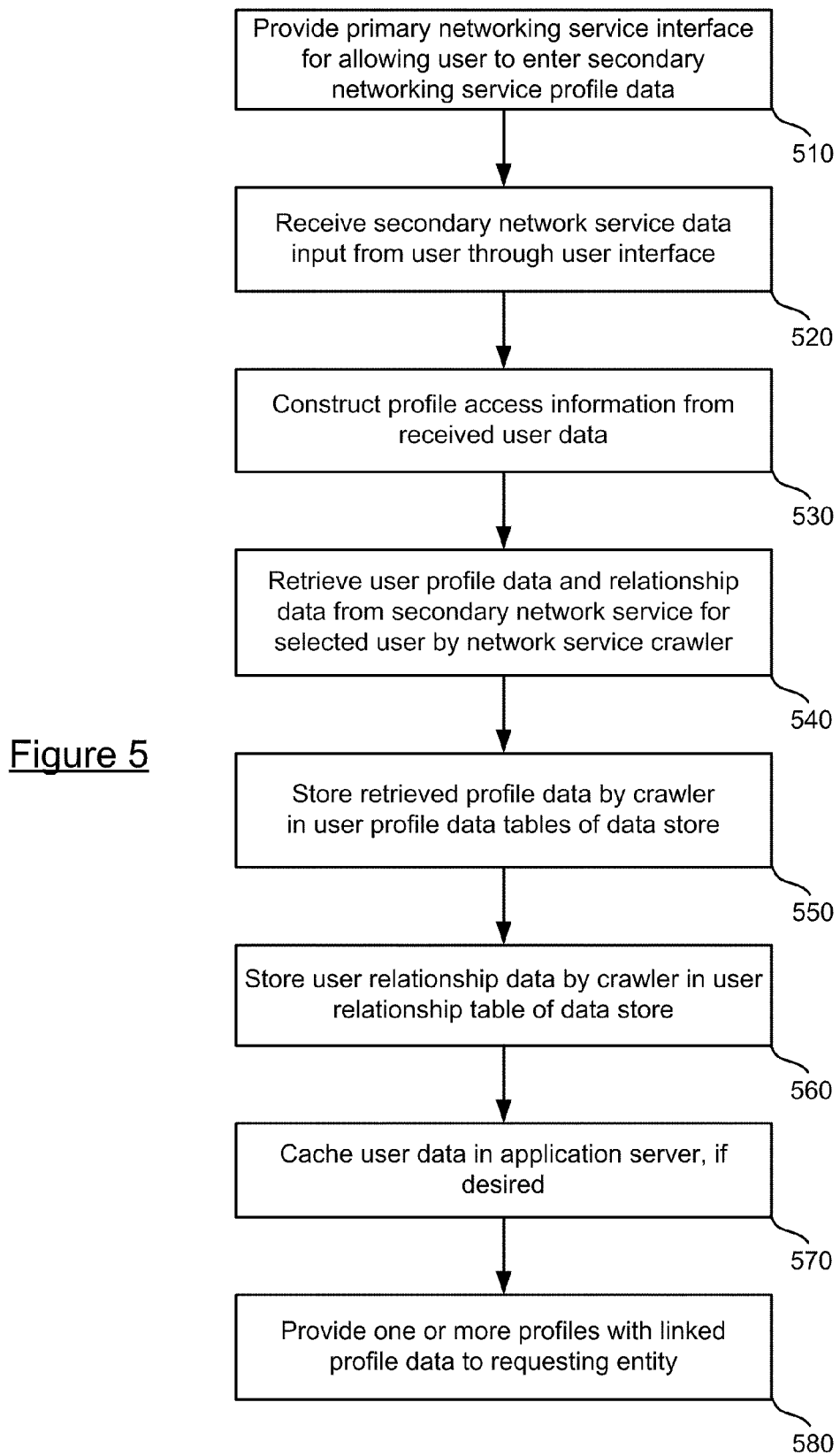
FIG. 5 is a flow chart of an embodiment of a method for accessing and storing user profile data.

FIG. 5 is a flow chart of an embodiment of a method for accessing and storing user profile data. First, a user interface is provided by a primary networking service for allowing a user to enter secondary networking service profile data at step 510. The received profile data may relate to syndicated, predefined and undefined networking services. An example of a user interface used for receiving secondary networking service data is illustrated and discussed below with respect to FIG. 7.

Secondary networking service data input is received from a user through the user interface at step 520. A user may enter data related to secondary networking services, user identifiers in the services, and other information. The received data is used to access profile data within each of the secondary networking services, for example to generate a URL or other data from which profile data can be retrieved. With respect to FIG. 7, data for syndicated networking service A may be received as a selection of the <testlink>button, predefined networking services C through F may require a user identifier, and undefined networking service 750 may require a user identifier, profile URL and optionally other data.

Profile access information is constructed from the received user data at step 530. The profile access information can be constructed from a user identifier, previous information stored in configuration file 148 and other data. Constructing profile access information is discussed in more detail below with respect to FIG. 6.

Next, user profile data and relationship data is retrieved from a secondary networking service for the selected user by networking service crawler 150 at step 540. The profile data and relationship data can be retrieved from profile access information of a URL constructed at step 530 by crawler 150. In some embodiments, the profile and relationship data may be retrieved using other profile access information generated at step 530. Once the location of the data is known or constructed, the data may be retrieved by screen scraping, calling a service API to pull data, calling an API to push data to crawler 150, via an RSS feed, or in some other manner.

Retrieved profile data is then stored by crawler 150 in user profile data table 144 of data store 140 at step 550. In some embodiments, the retrieved profile data may be aggregated or merged with existing profile data for the primary networking service when stored. In some embodiments, the retrieved profile data can be aggregated or merged with primary networking service profile data when the data is requested or upon request of the user associated with the primary networking service account. Storing the retrieved profile data is discussed in more detail below with respect to FIG. 8.

User relationship data is stored by networking service crawler 150 in user relationship table 146 at step 560. The stored relationship data may include an identifier for the user for which the profile data was retrieved, a contact of the user as specified by the secondary networking service profile, and an identification of the networking service itself. If the contact has a profile with the primary networking service, the primary networking service user identifier of the contact is stored at step 560. If the contact does not have a primary networking service profile, the user identifier in the secondary networking contact is used. In some embodiments, after storing user relationship data, user data is cached in application server 130 at step 570. This step is optional and may provide a quicker access to certain profile requests by network server 120 to application server 130.

One or more profiles are then provided with linked profile data to a requesting entity at step 580. Linked data may include profile data for two or more profiles and/or services which are combined in some manner, such as through aggregation or merging of the data. A request from the requesting entity may specify one or more parameters and request one or more profiles or paths between two or more profiles. The parameters may include a criteria parameter and a relationship separation parameter. A criteria parameter specifies a requirement that a profile matching the request must meet, such as a user profile associated with a particular gender or city of residence. The relationship separation parameter may specify the degrees of separation between users, such as a two degree of separation illustrated in FIGS. 4A-4B between the first user and the third user. Providing one or more linked profiles is discussed in more detail with respect to FIG. 9.

Figure 6:
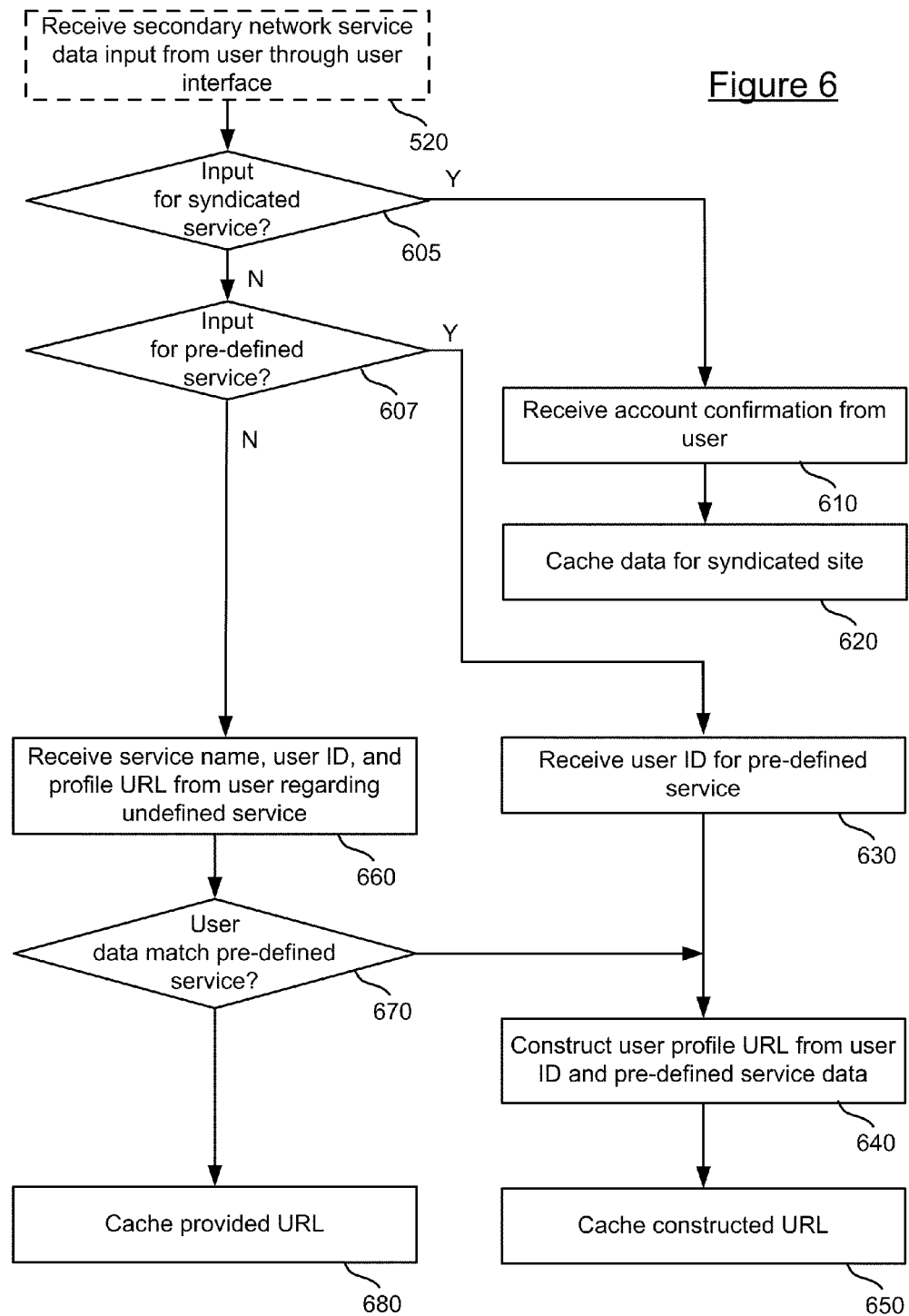
FIG. 6 is a flow chart and embodiment of a method for constructing profile access information.

FIG. 6 is a flow chart of an embodiment of a method for constructing profile access information. In some embodiments, the method of FIG. 6 provides more detail for step 530 in the method FIG. 5. Secondary networking service data input is received from a user through a user interface at step 520. This step is provided for reference purposes, and is identical to step 520 of the method of FIG. 5. A determination is then made as to whether the received input is for a syndicated service at step 605. If so, then the method of FIG. 6 continues to step 610. If not, a determination is made at step 607 as to whether the received input is for a pre-defined service. If the input is for a pre-defined service, the method of FIG. 6 continues to step 630. If not, the input is for an undefined service and the method of FIG. 6 continues to step 660.

An account confirmation is received from the user at step 610. The account confirmation may be received as a selection of the "<test link>" icon for the syndicated networking service in the user interface of FIG. 7. In other embodiments, an account confirmation selection may be received as selection of some other button or element of a user interface. After receiving an account confirmation, the syndicated networking service data is cached at step 620 and the method FIG. 6 ends.

If the received secondary networking service data input is for a predefined networking service at step 607, the input is received as a user identifier for the predefined service at step 630. With respect to FIG. 7, a user identifier is received for networking service C and networking service E within portion 740 of the user interface of FIG. 7. After receiving the user identifier, a user profile URL is constructed from the received user identifier and predefined service data contained in configuration file 148 of data store 140. The user profile URL for the secondary networking service is then cached at step 650 and the method FIG. 6 ends.

If the received secondary networking service input is determined to be for an undefined networking service at step 607, the data received includes the secondary networking service name, a user identifier, and service profile URL from the user regarding the undefined service at step 660. With respect to the user interface of FIG. 7, the undefined networking service data includes service name of "BlogTime," user identifier of "pmbloggr," and a profile URL of www.blogtime.com/pmbloggr. In some embodiments, additional information may also be received for the undefined networking service, such as a feed URL.

Next, a determination is made as to whether the received user data matches a predefined networking service at step 670. If the received user data matches a predefined networking service, the method of FIG. 6 continues to step 640. If the user data does not match a predefined service, the received profile URL is cached at step 680. To determine whether the user data matches the predefined service, the received base URL and user identifier may be compared to those in configuration file 148 and user profile table 144.

In some embodiments, during the process of crawling a user's primary and secondary profiles, the network crawler can ascertain with high confidence when a user has an account with a secondary service with an ID which is derived from the user's name and having content that matches elements of the user's profile in the primary networking service. The crawler may then retrieve data associated with the user's account for the secondary networking service and store the data for the user, in a manner similar to that described herein.

Figure 7:
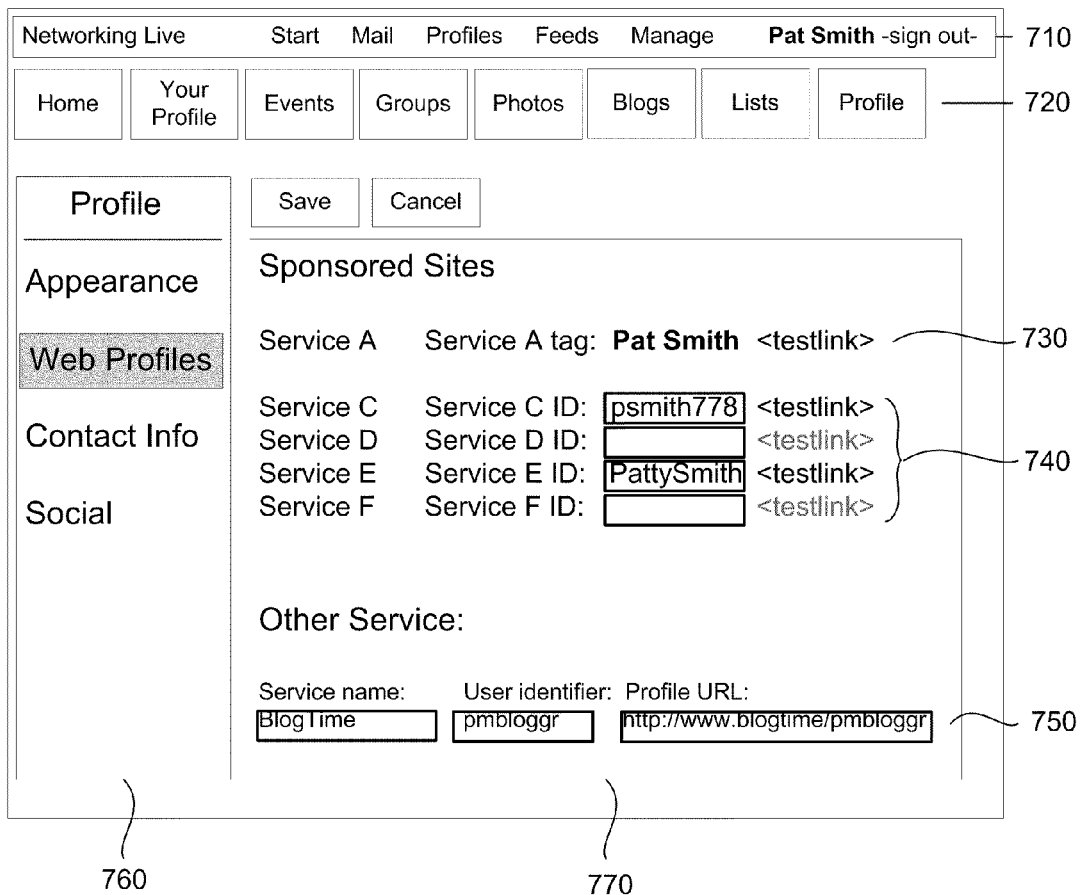
FIG. 7 is an example of a user interface for entering secondary networking service data.

FIG. 7 is an example of a user interface for entering secondary networking service data. The user interface of FIG. 7 is provided to a user by primary networking application 190 during the method of FIG. 6. FIG. 7 includes a networking service menu 710, profile action buttons 720, profile menu window 760 and profile data window 770. The networking service menu 710 includes menu headings of start, mail, profiles, feeds, manage and other information. Profile buttons 720 include buttons for home, your profile, events, groups, photos, blogs, lists and profile functions.

Profile menu window 760 includes selectable icons of appearance, web profiles, contact info and social. Currently, the web profiles window selection is selected within profile menu window 760. Profile data window 770 includes information listed for several secondary networking services. The services include syndicated service A in portion 730, pre-defined services C, D, E and F in portion 740, and one undefined service in portion 750. Syndicated service A includes a service tag of "Pat Smith". This syndicated service information may be pre-filled with the user identifier associated with the user of the primary networking service.

The predefined secondary networking services C-F include boxes where a user may enter a user identifier for each service. As illustrated, a user has entered a user identifier of "psmith778" for predefined service C and a user identifier of "PattySmith" for predefined service E. Predefined services D and F have boxes in which the user identifier is not filled in.

The portion 750 within profile data window 770 for undefined services includes boxes for service name, user identifier and profile URL. As illustrated, the service name box is filled in with "Blog Time", the user identifier box with "pmbloggr" and the profile URL with http://www.blogtime.com/pmbloggr.

Figure 8:
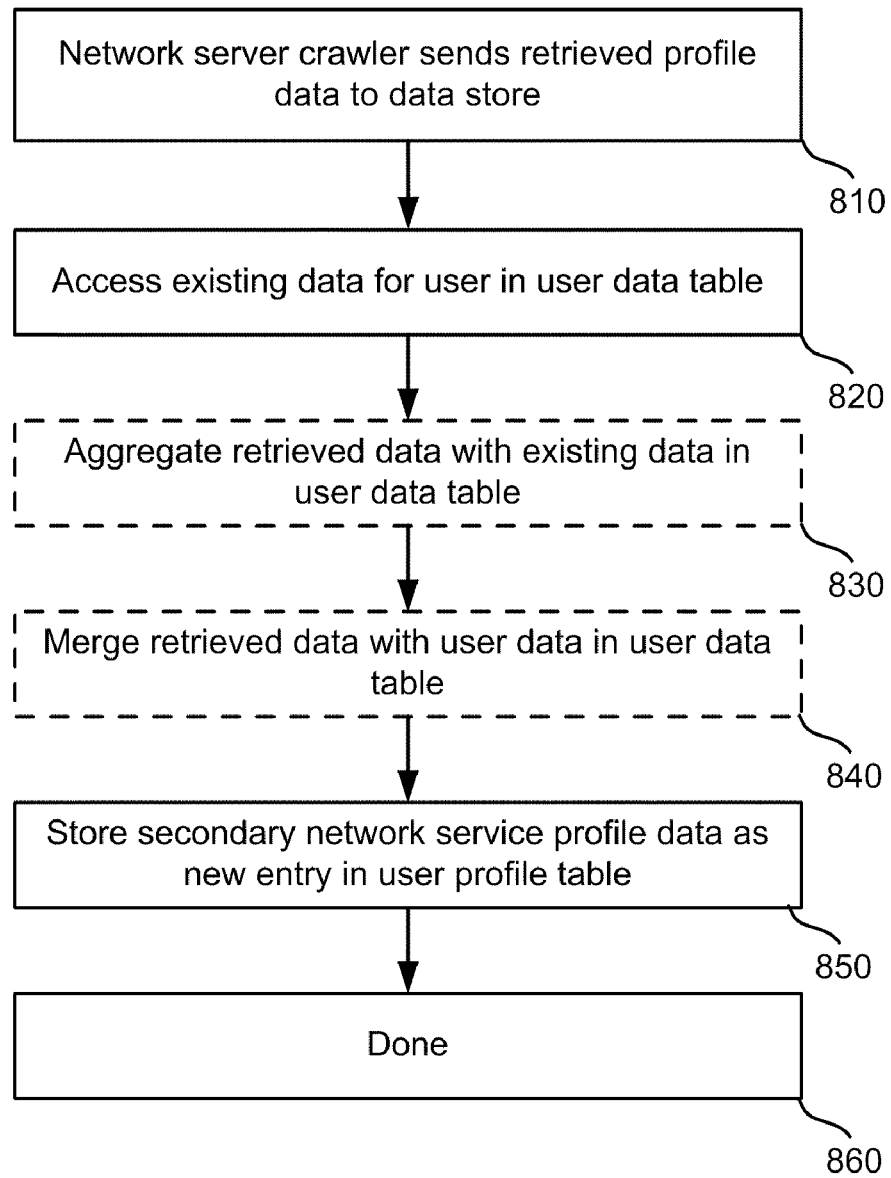
FIG. 8 is a flow chart and embodiment of a method for storing profile data for a secondary networking service.

FIG. 8 is a flow chart and embodiment of a method for storing profile data for a secondary networking service. In some embodiments, the flow chart of FIG. 8 provides more detail for step 550 of the method of FIG. 5. First, networking service crawler 150 sends retrieved profile data to data store 810. The data is retrieved from a secondary networking service. Next, existing data for a user in user table 142 is accessed at step 820. The retrieved data is then aggregated with the existing user data in user table 142 at step 830. Aggregating the data may include adding the retrieved data from a secondary networking service to the user data associated with the user profile within primary networking service 190. For example, user thumbnail photographs in a user's primary networking service profile and secondary networking service profile may both be stored with the primary network service. Other data, such as phone numbers, email addresses, addresses, and other information for a user's primary networking service profile and secondary networking service profile may be aggregated together in the user data table.

Alternatively, the retrieved data may be merged with user data and user table 142 at step 840. Merging data rather than aggregating data may involve selecting a single user icon, a single user address, a single favorite movie, and otherwise merging different versions of data into one user profile. For example, if a user's primary networking service profile and secondary networking service profile have the same residence address for the user, the residence address may be stored only once in the user data table. When user data between different profiles does not match, the data may be merged according to user created rules, date of creation (wherein the latest created data trumps earlier created data), or a user may be prompted to choose which data to include in the merged profile.

Next, the secondary networking service profile data is stored as a new entry in user profile table 144 of data store 140 at step 850. Storing the secondary networking service profile data as a new entry includes storing the user identifier, the networking service associated with the retrieved profile and the profile data retrieved from the secondary networking service. Additional data to be stored may include authentication credentials and/or a URL associated with the secondary service. The method of FIG. 8 then ends at step 860.

Figure 9:
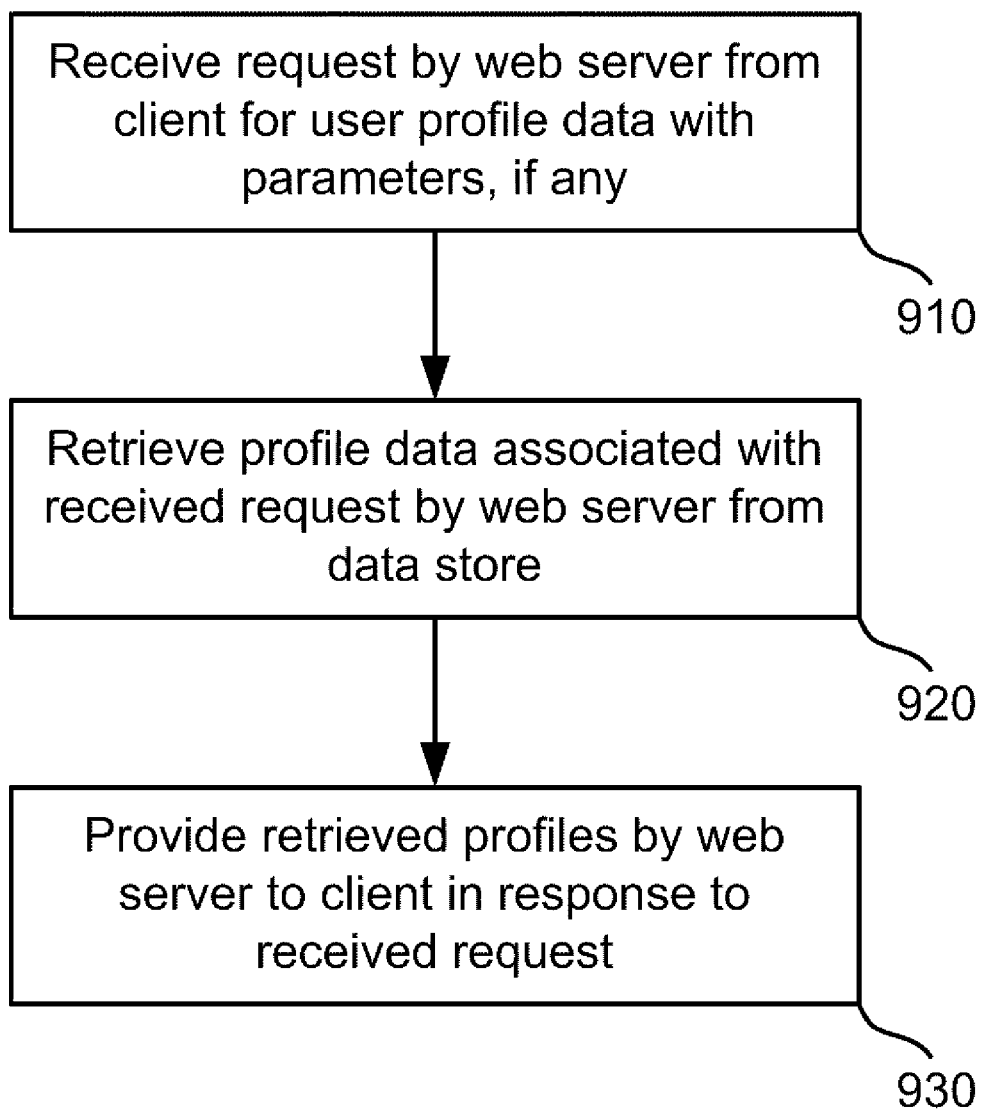
FIG. 9 is a flow chart of an embodiment of a method for providing profile data in response to a request.

Once data has been retrieved by networking service crawler 150 from one or more secondary networking services 192-194, the data may be requested, queried and otherwise retrieved in response to a user request. FIG. 9 is a flow chart of an embodiment of a method for providing profile data in response to a request. First, a request is received by network server 120 from client 110 for user profile data, with any parameters at step 910. The request may include parameters based on what type of data is requested. The parameters may include a criteria parameter and a relationship separation parameter. As discussed above, a criteria parameter specifies profile criteria to be included in each profile that matches a request and a relationship separation parameter specifies a degree of separation over user relationships. For example, a "list" type request may include parameters of a starting user S, a range of hops, or degrees of relationship separation, of users N and a criteria F to match. A list type query may be expressed as "show me all friends of friends that live in Seattle." In this case, the number of hops N would be two, the filter would be users having a residence of Seattle, and S would be the user's own profile.

Another type of request may be a "path" request. A path request may have parameters of a starting user, an end user, a number of hops N and criteria F. For example, a path request may be worded as "show me the mutual matches between Dave and Mike that work at Acme." In this case, the beginning user may be Dave, the end user may be Mike, the number of hops may be open, and the criteria may be having a work address company name of "Acme".

Profile data associated with the received request is retrieved by network server 120 from data store 140 at step 920. The data may be retrieved through application server 130 by network server 120. This is discussed in more detail below with respect to the method of FIG. 10. After retrieving profile data associated with the request, retrieved profile data comprising one or more profiles are provided to client 110 by network server 120 in response to the received request. In one embodiment, duplicate relations between users are not displayed. Thus, if a first user and second user have a trust relationship in networking service A and networking service B, only one connection is illustrated between the two users. In some embodiments the networks in which the user and contact have a trust relationship are indicated in the user interface. An example of a profile content page which illustrates relationship data over multiple networks is provided in FIG. 11.

Figure 10:
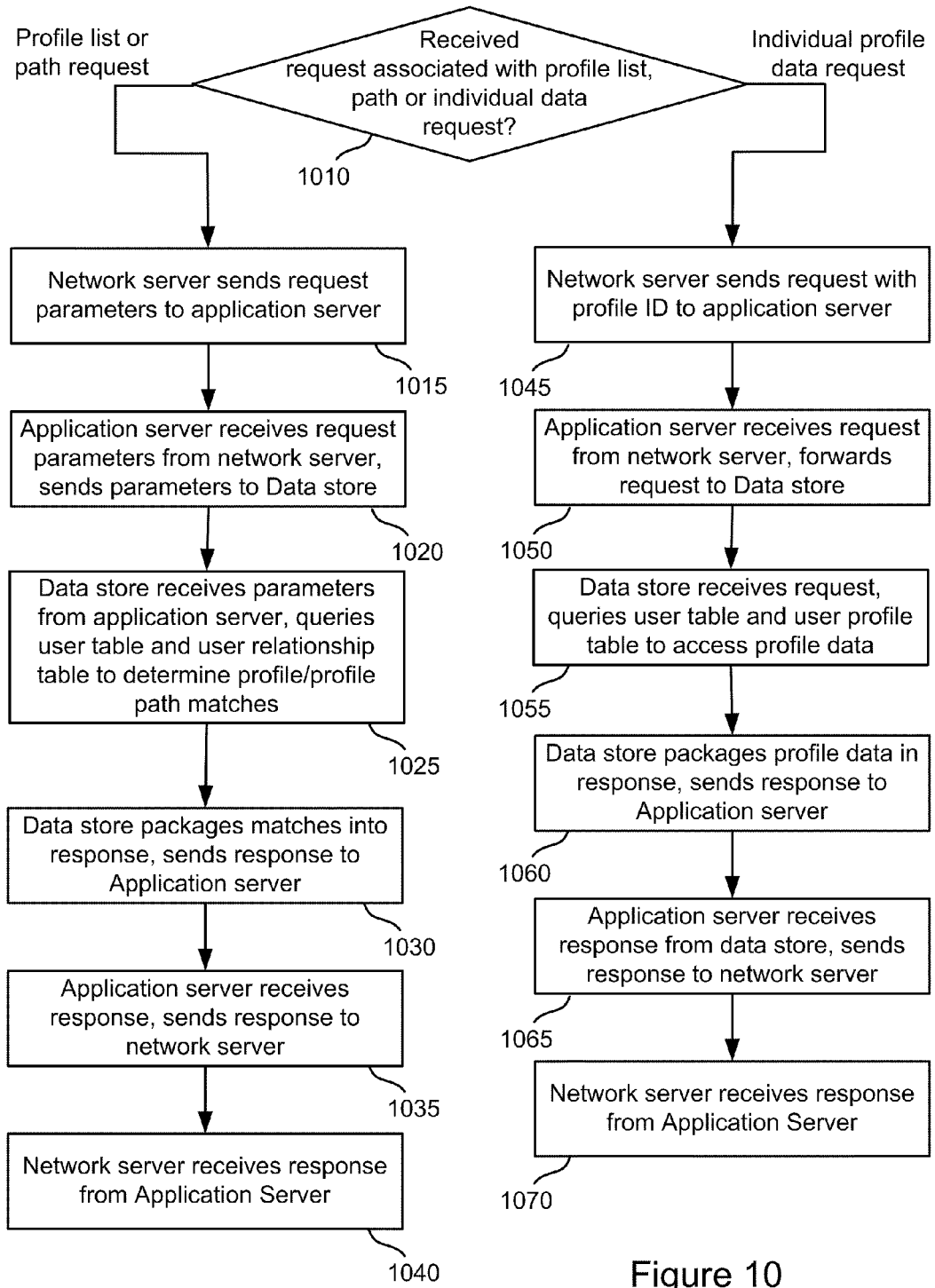
FIG. 10 is a flow chart of an embodiment of a method for retrieving profile data.

FIG. 10 is a flow chart of an embodiment of a method for retrieving profile data. In one embodiment, the method of FIG. 10 provides more detail for step 920 of the method of FIG. 9. First, a determination is made as to whether a received request is associated with a profile list, a path or individual data request at step 1010. If the received request is associated with a profile list or path request, network server 110 sends the request parameters to application server 130 at step 1015. Application server 130 receives the request parameters from network server 120 and sends the parameters to data store 140 at step 1020. Data store 140 receives the parameters from application server 130, and queries user table 142 and user relationship table 146 to determine the profile and/or profile path matches at step 1025. As discussed above, data store 140 may be implemented as one or more SQL servers. As such, the servers may have business logic which may be queried for the particular relationship and/or profile data requested.

Data store 140 determines the results of the query, packages the matching profiles into a response, and sends the response to application server 130 at step 1030. Next, application server 130 receives the response and forwards the response to network server 120 at step 1035. Network server 120 receives the response from application server 130 at step 1040. The method of FIG. 10 then ends with respect to profile list and path requests at step 1040.

If the received request is associated with an individual profile date of request at step 1010, network server 120 sends a request with the profile I.D. to application server 130 at step 1045. Application server 130 receives the request from network server 120 and forwards the request to data store 140 at step 1050. Data store 140 receives the request and queries user table 142 and user profile table 144 to access profile data associated with the requested user identifier at step 1055. Data store 140 then packages profile data corresponding to the query results into a response and sends the response to application server 130 at step 1060. Application server 130 receives the response from data store 140 and sends the response to network server 120 at step 1065. Network server 120 receives the response from application server 130 at step 1070.

Figure 11:
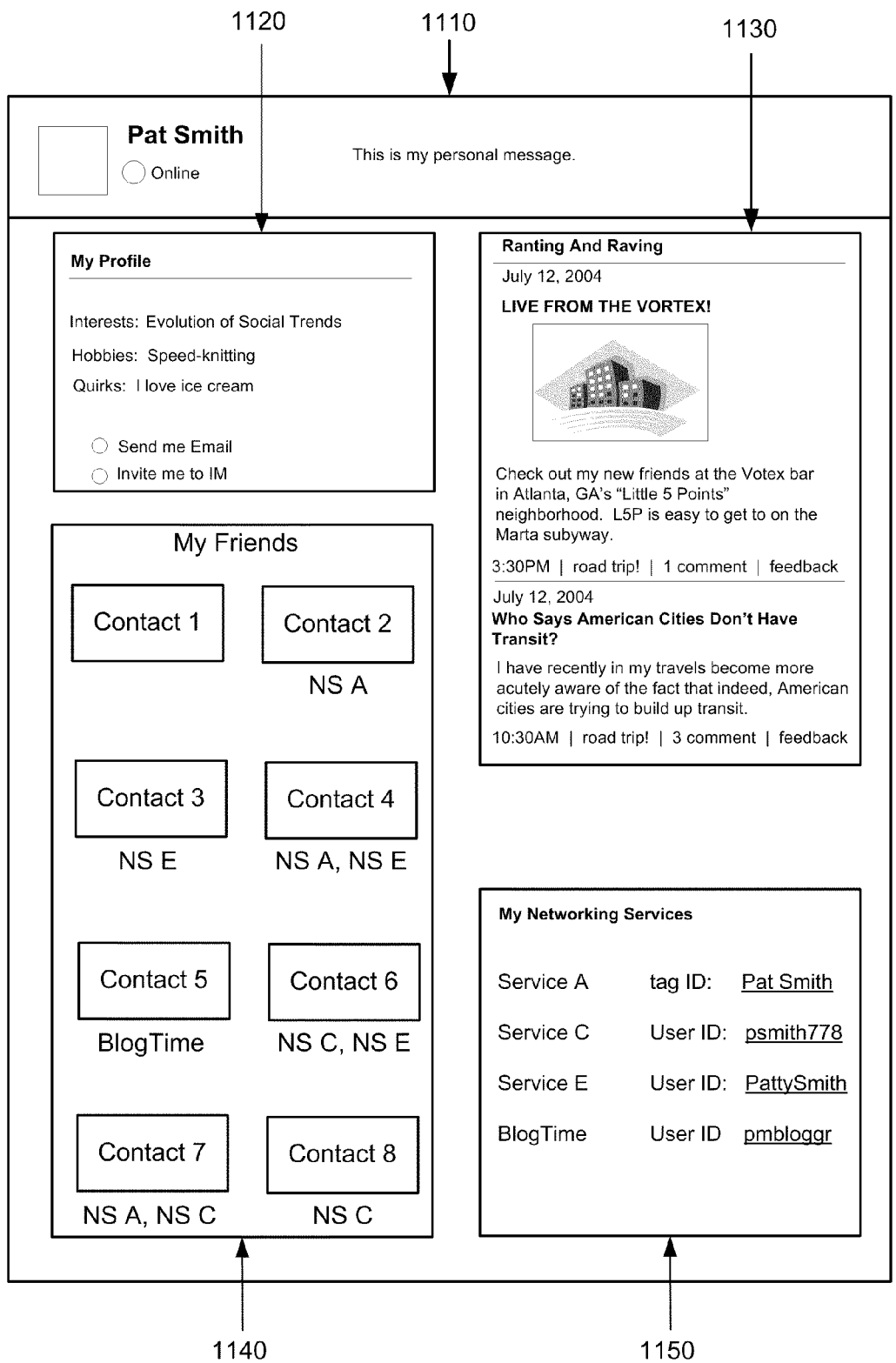
FIG. 11 is an example of a content page providing a profile with relationship data for its multiple networks.

FIG. 11 is an example of a content page providing a profile with relationship data for several networks. In one embodiment, the profile of content page 1110 of FIG. 11 includes data for a primary networking service profile and data retrieved from one or more secondary networking service profiles. As illustrated at the top of the content page, the profiles associated with a user called "Pat Smith." Content page 1110 includes profile data 1120, blog 1130, networking services list 1150 and contact list 1140. Profile data 1120 includes basic profile information, such as interests, hobbies, quirks and contact information for email and instant messaging. Blog 1130 includes the current entry of a blog and one or more previous blog entries for the user associated with the content page.

Networking services list 1150 includes a list of the secondary networking services that the user is associated with. The list of services include service A, service C, service E and "Blog Time." These services correspond to the secondary networking services in which a user provided information in the user interface of FIG. 7. Contact list 1140 of content page 1110 includes eight contacts. An indication is associated with each contact as to the context in which each contact has a relationship with the profile user in addition to the primary networking service which provides the content page. For example, the current user of the current profile has a relationship with contact 2 through networking service A in addition to the primary networking service. The current user has relationships with contact 4 through networking service A and networking service E, as indicated directly under the icon for contact 4. The profile owner only has a connection with contact one through the primary networking service, as indicated by no listings of additional networking services immediately underneath the icon for contact 1. The user of the current profile has a relationship with contact 5 through the undefined service of "Blog Time" as indicated by the listing of "Blog Time" networking service directly underneath contact 5. It is to be understood that the listing of contacts, contact relationships and lists of secondary networking services may be done in several ways. The example is illustrated in FIG. 11 and other examples discussed herein are intended as examples only, and are not intended to limit the scope of displaying this information.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for storing data, comprising:
   identifying a first user of a primary networking service associated with a first set of profile data maintained by the primary networking service, the first set of profile data including a user identifier for the first user in connection with a secondary networking service;
   using the user identifier, automatically accessing the secondary networking service and retrieving from the secondary networking service a second set of profile data associated with the first user, a user identifier for at least one contact associated with the first user, and relationship data indicating the relationship between the first user and the at least one contact;
   aggregating the first set of profile data associated with the primary networking service with the second set of profile data retrieved from the secondary networking service; and
   storing the aggregated profile data, the user identifier for the at least one contact associated with the first user in the secondary networking service and the relationship data retrieved from the secondary networking service in a data store maintained by the primary networking service.

2. The computer implemented method of claim 1, wherein the second set of profile data is retrieved by a crawler mechanism in communication with the one or more data stores.

3. The computer implemented method of claim 1, wherein said step of storing includes:
   determining whether the at least one contact in the secondary networking service has a profile in the primary networking service;
   when at least one contact in the secondary networking service has a profile in the primary networking service, storing the user identifier for the at least one contact associated with the primary networking service; and
   when at least one contact in the secondary networking service does not have a profile in the primary networking service, storing the user identifier for the at least one contact associated with the secondary networking service.

4. The computer implemented method of claim 1, wherein said step of storing includes:
   storing the aggregated data in a user profile table.

5. The computer implemented method of claim 1, wherein said step of storing includes:
   storing user identification information for the primary networking service and profile relationship data associated with the secondary networking service account in a user relationship table.

6. The computer implemented method of claim 1, further comprising:
   providing a user interface configured to allow a first user to designate at least a user identifier for each secondary networking service that the first user maintains an account with, wherein the user interface is provided by the primary networking service; and
   storing the information provided by the user via the user interface in a data store maintained by the primary networking service.

7. The method of claim 1, wherein the step of accessing and retrieving comprises:
   obtaining the user identifier for the first user from the first set of profile data;
   identifying that the secondary networking service is a predefined networking service;
   retrieving a profile URL associated with the secondary networking service from a configuration file; and
   establishing a connection with the secondary networking service using the user identifier and profile URL.

8. The computer implemented method of claim 1, wherein said step of retrieving a second set of profile data associated with the first user includes:
   determining location information of the second set of profile data of the secondary networking service and the user identifier for the first user associated with the secondary networking service account; and accessing the second set of profile data of the secondary networking service using the location information.

9. The computer implemented method of claim 8, wherein said step of determining location information includes:

determining a URL based on the user identifier.

10. The computer implemented method of claim 8, wherein said step of determining location information includes:

determining the location information from the user identifier and a URL data contained in a configuration file accessible by the primary networking service.

11. One or more computer readable storage memories having processor readable code embodied on said computer readable storage memories, said processor readable code for programming the memories to perform a method comprising:

importing, from at least one secondary networking service, user profile data associated with a first user, a user identifier for at least one of the first user's contacts in the secondary networking service, and user relationship data between the first user and the at least one contact;

aggregating the imported user profile data, user identifier for the at least one contact and user relationship data with existing user profile data, existing user identifiers for the at least one contact and existing relationship data stored in a data storage device of the primary networking service;

storing the aggregated user profile data, user identifiers and relationship data in the data storage device;

receiving a request from a client for one or more user profiles associated with the first user that match a profile parameter and a relationship separation parameter;

querying the data storage device for the requested one or more user profiles matching the profile parameter and the relationship separation parameter contained in the query;

receiving the one or more matching user profiles from the data storage device; and providing the one or more matching user profiles to the client.

12. The one or more computer readable storage memories of claim 11, wherein said step of querying a data store includes:

accessing a user relationship table that contains relationship data between users of the primary networking service over the one or more secondary networking services.

13. The one or more computer readable storage memories of claim 11, wherein the relationship separation parameter indicates the degrees of separation allowed between the at least one contact associated with the first user and the first user.

14. The one or more non-transitory computer readable storage memories of claim 11, wherein the relationship separation parameter indicates:

a first trusted relationship exists between a first user and a second user in the primary networking service;

a second trusted relationship exists between the second user and a third user in the secondary networking service; and a relationship exists between the first user and the third user over two degrees of separation.

15. A computer implemented method for accessing data, comprising:

selecting a first user of a primary networking service associated with a first set of profile data maintained by the primary networking service, wherein the first set of profile data includes a user identifier for the first user associated with a secondary networking service storing a second set of profile data for the first user and user profiles of at least one contact associated with the first user in the secondary networking service;

using the user identifier, retrieving the second set of profile data associated with the first user and a user identifier for the at least one contact from the secondary networking service, wherein the retrieved second set of profile data includes relationship data linking the first user to the at least one contact associated with the first user;

storing the second set of profile data in one or more data storage devices associated with the primary networking service;

receiving a request for one or more user profiles associated with the first user, the request containing a relationship separation parameter;

selecting the user profiles stored in the one or more data storage devices that match the relationship separation parameter;

providing the selected user profiles to the client.

16. The method of claim 15, wherein the step of retrieving the second set of profile data comprises:

retrieving a URL associated with the secondary networking service from a configuration file;

establishing a connection with the secondary networking service using the URL retrieved from the configuration file and the user identifier in the first set of profile data.

* * * * *

UNITED STATES PATENT AND TRADEMARK OFFICE
CERTIFICATE OF CORRECTION

| | | |
|---|---|---|
| PATENT NO. | : 8,073,928 B2 | Page 1 of 1 |
| APPLICATION NO. | : 12/904989 | |
| DATED | : December 6, 2011 | |
| INVENTOR(S) | : Rob Dolin et al. | |

It is certified that error appears in the above-identified patent and that said Letters Patent is hereby corrected as shown below:

In column 1, line 7-8, delete "patent application" and insert -- Patent Application --, therefor.

In column 16, line 6, in Claim 14, after "one or more" delete "non-transitory".

Signed and Sealed this
Tenth Day of January, 2012

David J. Kappos
*Director of the United States Patent and Trademark Office*